No. 707,891. Patented Aug. 26, 1902.
J. S. ALEXANDER.
MEANS FOR CERTIFYING CHECKS OR OTHER INSTRUMENTS.
(Application filed Mar. 20, 1901. Renewed Aug. 1, 1902.)

(No Model.)

Inventor
John S. Alexander
by his Attorneys

Witnesses:
Herman E. Metius
Hamilton D. Turner

UNITED STATES PATENT OFFICE.

JOHN S. ALEXANDER, OF NEW YORK, N. Y.

MEANS FOR CERTIFYING CHECKS OR OTHER INSTRUMENTS.

SPECIFICATION forming part of Letters Patent No. 707,891, dated August 26, 1902.

Application filed March 20, 1901. Renewed August 1, 1902. Serial No. 117,996. (No model.)

*To all whom it may concern:*

Be it known that I, JOHN S. ALEXANDER, a citizen of the United States, and a resident of the city of New York, State of New York, have invented certain Improvements in Means for Certifying Checks or other Instruments, of which the following is a specification.

The object of my invention is to provide a means of certifying checks, drafts, or other instruments representing money or property which will be more convenient for the drawer of the instrument, for the certifying person, firm, or corporation, and also for the one in whose favor the instrument is drawn than the means now in use for the purpose. This object I attain by the use of certifying-stamps issued for value received by the certifying or guaranteeing government, sovereign, person, firm, corporation, society, association, &c., (hereinafter for convenience simply termed the "certifier") and affixed to the instrument by the drawer thereof in quantity sufficient to represent the amount of money or property for which the instrument is drawn.

In the accompanying drawing is represented a view of a check with certifying-stamps affixed thereto in accordance with my invention.

Persons who desire to send small sums of money have long contended against the inadequacy and inconvenience of the present system. Even those who have bank accounts, and they form but a limited part of the community, are averse to drawing checks for trifling amounts. To transmit money through the mails, therefore, the ordinary citizen is restricted to the money-order, bank or treasury notes, to coin, and to postage-stamps. To procure a money-order, it is necessary to go to the post-office at a sacrifice of time and sometimes money. Paper money and coin can scarcely be sent in safety unless in a registered letter, and this also calls for a visit to the post-office, and postage-stamps are also an undesirable medium and are not always accessible in quantity. Further than this, ordinary business transactions frequently require the certification or guaranteeing by a second party of an instrument representing money, property, service, or the like drawn by another party, and the accomplishment of such certification or guarantee is often difficult for reasons independent of the financial part of the transaction. In other words, while the instrument may be perfectly good and the certifier willing to certify it it is inconvenient or difficult for the drawer of the instrument and the certifier to get together in order that the transaction may be completed, this being especially true when the parties to the transaction are located in places more or less remote from each other.

My invention is intended to overcome the difficulties before noted; and it consists in providing a check, draft, certificate, money-order, warehouse-receipt, bill of sale, order, ticket, or other instrument representing money, property, or service with a stamp or stamps issued for value received by the certifier, each stamp being provided with an identifying-mark applicable only to the person to whom the stamp is issued, so that it is differentiated from stamps of the same denomination and of the same certifier issued to others, whereby the instrument will have the same force and effect to the extent of the certifying value of the stamp or stamps affixed as if it were directly signed and issued by the certifier. Safety is secured by providing for the affixing to each stamp or to those of any considerable value the signature of the drawer, purchaser, or owner of the instrument to which it is to be attached and also, if desired, the signature of the certifier or a representative of the certifier. Thus the drawing represents a check for the sum of six dollars and sixty cents, drawn by John Doe, of Portland, Maine, in favor of Richard Roe, of Portland, Oregon, upon the Pacific National Bank, of Portland, Oregon, with stamps certified by the Blank National Bank, of New York city, countersigned and issued by the People's Bank, of Oswego, New York, each of the certifying-stamps having some means of identification of the certifier either in the form of a facsimile-signature, initials, monogram, or the like, and a space for the signature or initials of the drawer of the instrument and also, if desired, of the agent of the certifier, as in the case of the stamps of the value of one dollar and five dollars. (Shown in the drawing.)

The checks may be drawn on any of the specified correspondents of the bank issuing the forms, a list of such correspondents being furnished with the forms, and as the bank issuing the forms is likely to be one having correspondents in all parts of the country the checks are desirable par funds wherever used or sent by mail. The system may be used by a corporation, an individual, a firm, an individual bank, a clearing-house, a group of banks, or a bankers' association, and a bank not issuing its own forms may act as agent for one or more larger banks using the system or for a bankers' association. Thus in the case of the check shown the People's Bank, of Oswego, New York, acts as agent for the Blank National Bank, of New York.

The certifier may grant to the person purchasing its certifying-stamps checking privileges, either directly or through an agency, upon correspondents in all parts of the country, who will pay the stamped checks on presentation without notice and with or without identification of the payee, as desired by the drawer of the check.

The purchaser of the stamps may either restrict the signing of checks to himself or any other designated person or may permit any other person or persons to sign all or part of them, the privileges all being at the risk of the purchaser of the stamps and not affecting the certifier concerned.

It is intended that every paid check shall be preserved by the payer for a certain time, so that it is its own record, showing who signed and who collected it. Therefore no matter under what conditions used it is safer and more satisfactory than an inclosure of money, while all necessary latitude in the drawing of the check is permitted to the drawer to insure the success of a system of this kind.

The number and size of checks against a deposit is immaterial, as an overdraft is impossible, and the checks can be drawn upon correspondents either in the country of the person, firm, or corporation drawing the check or upon correspondents in foreign countries and for money in the currency of the country of the correspondent on whom the check is drawn.

The face of each stamp contains a designation of the value of the same so disposed that the units of value and the fractional parts of such units occupy different lateral relation to the stamp, whereby when the stamps are affixed to the instrument in vertical alinement and are of the same width the units and fractions form columns in which said units and fractions bear the proper relation to each other, whereby the aggregate amount of the stamps affixed to the instrument can be summed up at a glance.

The provision upon each stamp or upon those of any considerable value for the signature of the drawer of the instrument to which the stamp is to be affixed protects the stamp from misuse in case it is lost or stolen, it being intended that the purchaser of the stamp shall affix his signature thereto when first purchased, so that no one of the stamps will be good unless attached to an instrument bearing a corresponding signature or a signature in a letter referring thereto and addressed to the payer.

The issuer of the stamps may provide for the payment of a designated fee, either by charging the necessary excess for the stamps when issued or by stamps such as shown at $x$ in the drawing, which must be affixed to the check to an amount constituting the determined fee for the amount for which the check or other instrument is drawn.

The issuer of the certifying-stamps may protect the purchaser from loss in case any of the stamps are lost or stolen by providing for a reissue of stamps to the amount of those thus lost upon receipt of proper bond of indemnity from the purchaser, thus rendering as liberal as possible the conditions under which the stamps can be used, and it will be evident that postal checks payable by a postmaster at any designated office may be issued by the Government to be certified by the affixing of a stamp or stamps in the manner shown.

While I have shown my invention as embodied in a check calling for a payment of money, it will be evident that the same system can be used in certifying to or guaranteeing other instruments, whether representing money or property—such, for instance, as quantities or value of merchandise in certificates, warehouse-receipts, bills of lading, &c., or to bills of sale, orders, or other documents wherein a certifying or guaranteeing of the instrument by a government, sovereign, person, firm or corporation, or the like is required, with the intent that the fixing of such stamp or stamps will give the instrument the same force and effect to the extent of the certifying value of the stamp affixed as if it were directly signed and issued by the certifier.

The stamps can of course be varied in wording, size, shape, color, design, or otherwise to best meet in each case the special purpose for which they are intended to be used.

Having thus described my invention, I claim and desire to secure by Letters Patent—

1. A check, draft, or other instrument representing value or property, said instrument having affixed thereto a stamp or stamps issued by another than the drawer of the instrument, and bearing matter certifying to or guaranteeing the amount for which it is drawn, and also containing an identifying-mark applicable only to the drawer or purchaser of the stamp or stamps and identifying and differentiating said stamp or stamps from other stamps of the same value issued by the same certifier to other purchasers.

2. A certifying-stamp for a check, draft or other instrument representing value or property, said stamp bearing matter certifying to or guaranteeing the face value of said stamp and said stamp having an identifying-mark, other than that of the certifier, applicable only to the purchaser and identifying and differentiating it from other stamps of the same value issued by the same certifier to other purchasers.

3. A certifying-stamp for a check, draft or other instrument representing value or property, said stamp bearing matter certifying to or guaranteeing the face value of said stamp and said stamp having an identifying-signature, other than that of the certifier, applicable only to the purchaser and identifying and differentiating it from other stamps of the same value issued by the same certifier to other purchasers.

4. A check, draft, or other instrument, representing value or property, said instrument having affixed thereto stamps issued by another than the drawer of the instrument, and certifying to or guaranteeing the amount for which it is drawn, each of said stamps having marked upon it in figures, the amount represented by it, the figures upon the stamps representing units of value occupying a different lateral relation thereto from those upon the stamps which represent fractional parts of said unit and figures of the same denomination being in vertical alinement.

In testimony whereof I have signed my name to this specification in the presence of two subscribing witnesses.

JOHN S. ALEXANDER.

Witnesses:
F. E. BECHTOLD,
JOS. H. KLEIN.